United States Patent
Altendorf et al.

(10) Patent No.: US 10,312,840 B2
(45) Date of Patent: Jun. 4, 2019

(54) CONTROL CIRCUIT AND CONTROL METHOD FOR A SYNCHRONOUS MACHINE

(71) Applicant: DENTSPLY SIRONA Inc., York, PA (US)

(72) Inventors: Hans-Walter Altendorf, Worms (DE); Volker Hill, Bensheim (DE)

(73) Assignee: DENTSPLY SIRONA Inc., York, PA (US)

( * ) Notice: Subject to any disclaimer, the term of this patent is extended or adjusted under 35 U.S.C. 154(b) by 0 days.

(21) Appl. No.: 15/118,634

(22) PCT Filed: Feb. 16, 2015

(86) PCT No.: PCT/EP2015/053207
§ 371 (c)(1),
(2) Date: Aug. 12, 2016

(87) PCT Pub. No.: WO2015/121467
PCT Pub. Date: Aug. 20, 2015

(65) Prior Publication Data
US 2017/0070169 A1  Mar. 9, 2017

(30) Foreign Application Priority Data
Feb. 14, 2014  (DE) .................. 10 2014 202 771

(51) Int. Cl.
*H02P 6/18*   (2016.01)
*H02P 6/182*  (2016.01)

(52) U.S. Cl.
CPC .................................. *H02P 6/182* (2013.01)

(58) Field of Classification Search
CPC .... H02M 1/08; H02M 1/34; H02M 2001/007; H02M 7/5387; H02M 1/32;
(Continued)

(56) References Cited

U.S. PATENT DOCUMENTS 4,054,818 A * 10/1977 Risberg ................... H02P 27/06
                                                          318/807
4,697,230 A *  9/1987 Neft ........................ H02M 3/10
                                                          361/88

(Continued)

FOREIGN PATENT DOCUMENTS

CN        1215944 A     5/1999
CN     102739139 A    10/2012
(Continued)

OTHER PUBLICATIONS

Machine translation of German Office Action dated Jan. 26, 2015.
(Continued)

*Primary Examiner* — Erick D Glass
(74) *Attorney, Agent, or Firm* — Dentsply Sirona Inc.

(57) ABSTRACT

The invention relates to a control circuit for a synchronous machine (1) of a dental handpiece, comprising a voltage supply (2) and a clamping circuit (7) connected by switches (6). The invention also relates to a method for determining an angular position of a rotor of a synchronous machine (1), wherein a power supply is switched off for a total period of time (T2), a clamping circuit (7) is connected for a time interval (T1), whereupon an electromotive force is measured, and the angular position is determined from the electromotive force.

6 Claims, 2 Drawing Sheets

(58) Field of Classification Search
CPC ... H02M 2001/342; H02M 2005/2932; H02M 2007/4835; H02M 3/158; H02M 3/337; H02M 7/48; H02M 7/487; H02M 7/49; H02M 2001/0009
USPC .................................................. 318/400.34
See application file for complete search history.

(56) References Cited

U.S. PATENT DOCUMENTS

| | | | | |
|---|---|---|---|---|
| 5,005,115 | A * | 4/1991 | Schauder | H02M 5/271 363/159 |
| 6,169,672 | B1 * | 1/2001 | Kimura | H02M 1/34 361/91.8 |
| 6,236,179 | B1 * | 5/2001 | Lawler | B60L 11/1807 318/375 |
| 7,176,653 | B2 * | 2/2007 | Jahkonen | H02M 1/088 318/503 |
| 7,489,097 | B2 * | 2/2009 | Fu | B60K 6/26 318/400.01 |
| 7,518,256 | B2 * | 4/2009 | Juanarena Saragueta | H02P 6/005 290/44 |
| 7,839,107 | B2 * | 11/2010 | Sauter | G01P 3/44 318/400.32 |
| 7,940,503 | B2 * | 5/2011 | Volke | H03K 17/0822 361/56 |
| 7,994,747 | B2 * | 8/2011 | Boling | G11B 19/2054 318/400.22 |
| 8,207,700 | B2 * | 6/2012 | Syrman | H02P 3/26 187/288 |
| 8,294,410 | B2 * | 10/2012 | Ams | H02P 29/02 318/609 |
| 2006/0192390 | A1 * | 8/2006 | Juanarena Saragueta | H02P 6/005 290/44 |
| 2006/0214624 | A1 * | 9/2006 | Jahkonen | H02M 1/088 318/807 |
| 2008/0101777 | A1 * | 5/2008 | Sauter | G01P 3/44 388/809 |
| 2008/0106224 | A1 * | 5/2008 | Fu | B60K 6/26 318/139 |
| 2009/0015186 | A1 * | 1/2009 | Boling | G11B 19/2054 318/507 |
| 2009/0296291 | A1 * | 12/2009 | Volke | H03K 17/0822 361/56 |
| 2010/0219022 | A1 * | 9/2010 | Syrman | H02P 3/26 187/277 |
| 2010/0315738 | A1 * | 12/2010 | Yamashita | G11B 21/12 360/71 |
| 2011/0084643 | A1 * | 4/2011 | Ams | H02P 23/12 318/798 |
| 2012/0262140 | A1 * | 10/2012 | Divan | H02M 3/156 323/282 |
| 2015/0263511 | A1 * | 9/2015 | Sandner | H02H 7/1252 363/53 |
| 2017/0264221 | A1 * | 9/2017 | Cash | H02P 6/12 |

FOREIGN PATENT DOCUMENTS

| | | |
|---|---|---|
| DE | 19527982 A1 | 2/1997 |
| DE | 10031423 A1 | 10/2001 |
| DE | 202011052205 U1 | 3/2012 |
| DE | 102012006491 A1 | 10/2012 |
| EP | 0993108 A2 | 4/2000 |
| EP | 2570291 A1 | 3/2013 |
| JP | S59159690 A | 9/1984 |

OTHER PUBLICATIONS

Machine translation of International Search Report dated Jun. 10, 2018.
Translation of Chinese Office Action dated Apr. 26, 2018.

* cited by examiner

CONTROL CIRCUIT AND CONTROL METHOD FOR A SYNCHRONOUS MACHINE

FIELD OF THE INVENTION

The invention relates to a control circuit for a synchronous machine of a dental handpiece having a voltage supply, as well as a method for determining the angular position of the rotor of a synchronous machine for controlling the rotational speed of the synchronous machine.

BACKGROUND OF THE INVENTION

Synchronous motors are known as electrical drives, such as for dental handpieces, i.e., synchronous machines operated with a motor, in which a rotor in the stator runs in sync with a moved rotary field.

To control such a synchronous machine, it is further known to determine the position of the rotor relative to the rotating stator field during operation. It is known, for example, from DE 195 27 982 AI to provide sensors for this purpose.

A disadvantage is that such a sensor constitutes an additional expense, and that integrating a sensor—for example, in a dental handpiece—can be problematic, given the hygienic requirements.

Another option for determining the rotor position is to measure the electromotive force (EMF) induced by the rotor. For this purpose, the motor windings must be de-energized, however, which takes a certain amount of time, in which drive output is not available. To reduce this time, it is, for example, known to demagnetize, which, however, results in braking torque.

As a result, there is a continual alternation between drive torque and a lack of torque, or even braking torque. These continuous changes in torque can lead to undesirable vibrations and noises.

A method and a device for determining the angular position of the rotor by measuring EMF are described in EP 0 993 108 A2. The method is based upon determining the electromotive force (EMF) induced in a stator winding by the rotor, wherein the other stator windings are short-circuited, and a power shortage close to a suspected zero crossing is generated.

The disadvantage is the dependency of the measurement on the zero crossing of the stator current. If, however, measurement does not occur close to the current zero crossing, this would yield a much longer wait time with regard to demagnetization, depending upon the momentary current value in the winding.

The object of the present invention is to provide a circuit and a method that make it possible to determine the EMF at any time of operating a synchronous machine, and to demagnetize the motor windings as quickly as possible and keep the overall measuring time short.

SUMMARY OF THE INVENTION

This object is achieved by a control circuit for a synchronous machine of a dental handpiece with a voltage supply which has a clamping circuit connected by a switch.

By means of the clamping circuit, a particularly fast demagnetization of the control circuit is achieved after an interruption of the voltage supply, which produces a nearly current-free state over a very short time and enables measurement of the electromagnetic force (EMF).

This renders long interruptions in the power supply to the synchronous machine unnecessary, which, in particular, prevents vibration and noise. Such a synchronous machine is, therefore, particularly suitable for use in dental handheld instruments, such as for endodontic treatments.

Furthermore, the control circuit according to the invention makes it possible to provide a motor without brushes or sensors for the control.

The voltage supply can, for example, be a full bridge. The switches can be powerful electronic switches such as power analog switches. In order to minimize the measuring pause, the switches should be very fast.

Advantageously, the clamp switch is clamped to a star point, or a simulated star point, of the control circuit.

Clamping to the star point of the control circuit makes quick demagnetization, and hence a particularly short measuring pause, possible.

For this purpose, the star point can be led out directly by an additional line which is clamped. The additional line and the associated contact points can be spared by simulating the star point in the control circuit and clamping the simulated star point. The position of the star point can be predetermined by the set voltage at the motor phases. Asymmetries in the synchronous machine can thereby be taken into account, and the EMF can be measured with sufficient precision, particularly when the voltages are very small.

Advantageously, the control circuit has a capacitor which images the start point.

Particularly in dental applications such as in dental handpieces, space is very restricted, and it is therefore advantageous to eliminate an additional access to the star point by simulating the star point. A capacitor that images the average voltage of the star point is a particularly simple element of a simulation of the star point.

Advantageously, the control circuit has a start unit which is connectable to the capacitor by means of a switch.

A connectable start unit makes it possible to adjust the capacitor to a start value before starting up the synchronous machine. The capacitor can therefore be charged to the anticipated value in advance, which can significantly reduce the startup phase for the synchronous machine.

Furthermore, the invention relates to a method for determining the angular position of a rotor of a synchronous machine, to control the rotary speed of the synchronous machine. The method provides for switching off a power supply to the synchronous machine for a total period of time while the synchronous machine is operating, and attaching a clamp switch for a time interval to a star point of the synchronous machine. Following a time interval, the electromagnetic force (EMF) is measured, and the angular position is determined therefrom.

Briefly connecting a clamping circuit makes it possible to achieve an almost completely current-free state of the synchronous machine as quickly as possible, which makes it possible to measure the EMF over a particularly short time. This prevents long interruptions in the power supply to the synchronous machine, as well as associated vibration and noise. Consequently, the method is particularly suitable for use in dental handheld instruments, such as for endodontic treatments.

The EMF is advantageously measured with high impedance. This minimizes the influence of voltage drops at the series resistances in the winding of the synchronous machine, which can be neglected. The resistance in the measurement should be at least 10,000 times greater than the resistive component of the winding. If the measurement is not performed with a high impedance, such voltage drops can also be calculated out of the measured values, if the corresponding constants are known.

Advantageously, the star point is imaged by a capacitor, and the capacitor is charged to an expected value before the power supply is switched on to operate the synchronous machine.

A capacitor is a simple way to simulate a star point and obviate an additional access for measuring. After startup, it takes a certain amount of time during a run-up phase until the capacitor reaches a constant value and images the star point. Pre-charging the capacitor to an expected value makes it possible to shorten the run-up time.

Advantageously, the EMF is measured several times per rotation of the rotor.

Repeated measurement makes it possible to prevent errors. For this purpose, measuring can occur several times sequentially after clamping, and a change between the measured values can be determined. If the change is minimal from measured value to measured value, no further measuring is necessary. The pause for measurement can be concluded, and the voltage supply to the synchronous machine can be reconnected. This makes it possible to again shorten the set measuring pause for determining the EMF.

BRIEF DESCRIPTION OF THE DRAWINGS

The control circuit according to the invention and the method according to the invention will be explained with reference to the drawings. In the drawings.

DETAILED DESCRIPTION OF THE INVENTION

Figure 1:
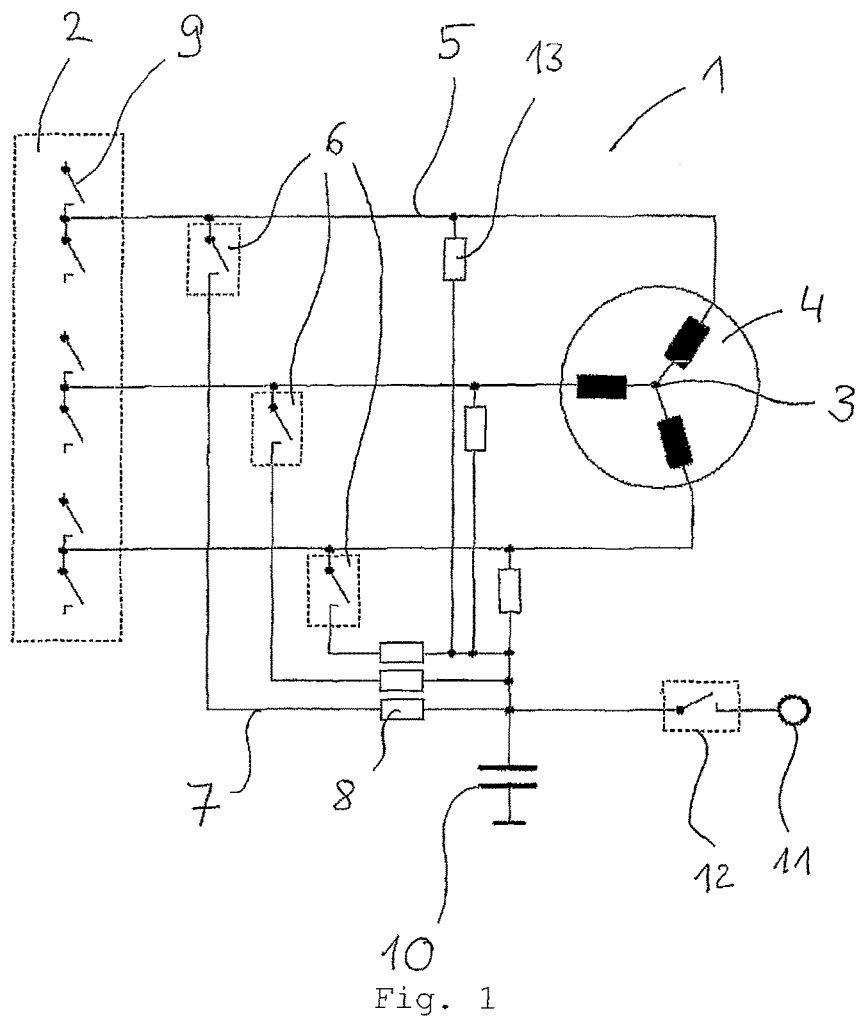
FIG. 1 shows a synchronous machine with a control circuit.

FIG. 1 shows a synchronous machine 1 with a voltage supply 2 designed as a full bridge, and three stator windings 4 connected in a star 3. The full bridge 2 is connected to a stator winding 4 via a lead 5. A clamping circuit 7 is attached to the lead 5 via a clamp and switch 6.

Figure 2:
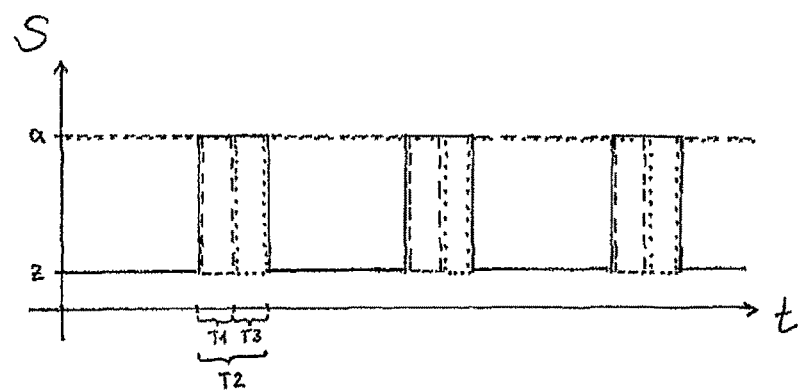
FIG. 2 shows a schematic representation of a method for determining the angular position of a rotor.

The switching and sampling states S of a method for measuring the angular position of a rotor are schematically portrayed in FIG. 2, wherein a closed switching state or sampling state is identified with "z," and an open switching state or non-sampling is identified with "a." The power supply is interrupted by the full bridge 2. For this purpose, the power supply can, for example, have switches 9, the switching state of which is depicted as a solid line. In this phase, the synchronous machine 1 more or less runs as a generator. A voltage generated by an induction current overlaps the voltage generated by this generator, however. To establish an unpowered state as quickly as possible, the clamping circuit 7 is demagnetized by connecting the clamping circuit 7 by means of the switch 6 across the resistance load. For this purpose, the clamping circuit 7 can, for example, have the resistors 8 depicted in FIG. 1.

The clamping circuit 7 is first connected for a short time interval T1. The switching state of the clamping circuit 7 or the switch 6 is depicted as a dashed line in FIG. 2. After the demagnetization which this achieves or after expiration of the time interval T1, the switch 6 is reopened, and the clamping circuit 7 is disconnected. The synchronous machine 1 is now running nearly current-free, and the EMF is measured with high impedance at the star point 3. In order to minimize errors and achieve as current-free a state as possible, the resistors 13, and possibly also the resistors 8, should be selected with high impedance. Sampling is depicted with a dotted line in FIG. 2. Subsequently, the power supply to the synchronous machine 1 is reconnected via the full bridge 2.

The total period of time T2 of the interruption of the voltage supply accordingly results from the time interval T1 and the time interval T3 needed to measure the EMF. The total period of time is particularly short because the time interval T2 can be kept very short, since demagnetization of the synchronous machine by means of the clamping circuit 7 can occur very quickly.

In order to minimize the time T3 needed to measure the EMF, the EMF can be measured several times sequentially as fast as possible after clamping, i.e., following time interval T1, and the measured values can be compared with the previous ones. If the measured value does not change or the change is less than, for example, a previously specified threshold, the time interval T3 is concluded, i.e., the measuring stops, and the power supply to the synchronous machine 1 is reconnected.

In the first embodiment sketched in FIG. 1, the EMF is not measured by measuring directly at the star point 3, since an additional lead would be needed for this, and a corresponding access is frequently avoided for reasons of space and/or expense—for example, in dental motors. Instead, the star point 3 in this embodiment is simulated by the resistors 13 and a capacitor 10. For this purpose, the capacitor 10 is connected to the leads 5 via the resistors 13. The star point 3 is thereby passively simulated.

The capacitor is connected to the stator windings 4 via high impedance resistors 13, so that the average star point voltage can be measured at the capacitor.

Since the resistors 13 must be high impedance because they would otherwise disturb operation, it takes relatively long after starting the synchronous machine 1 until the average star point voltage is reflected at the capacitor 10, and uninterrupted operation is possible. To achieve a stable value of the capacitor 10 as quickly as possible, a start unit 11 with presettable start conditions is connected to the capacitor 10 by a switch 12 in the embodiment in FIG. 1. The start unit 11 can, for example, be a voltage source with a presettable voltage value. Before and/or while starting the synchronous machine, the switch 12 can be closed, and the capacitor 10 can be precharged, so that it corresponds to the expected star point. Subsequently, the switch 13 is reopened, and also stays open for the remaining operating time of the synchronous machine 1.

By means of the start unit, the passive simulation of the star point can, at least initially, be actively set to an initial value. By pre-charging the capacitor, run-up difficulties can be avoided, or at least an annoying run-up time can be shortened.

Figure 3:
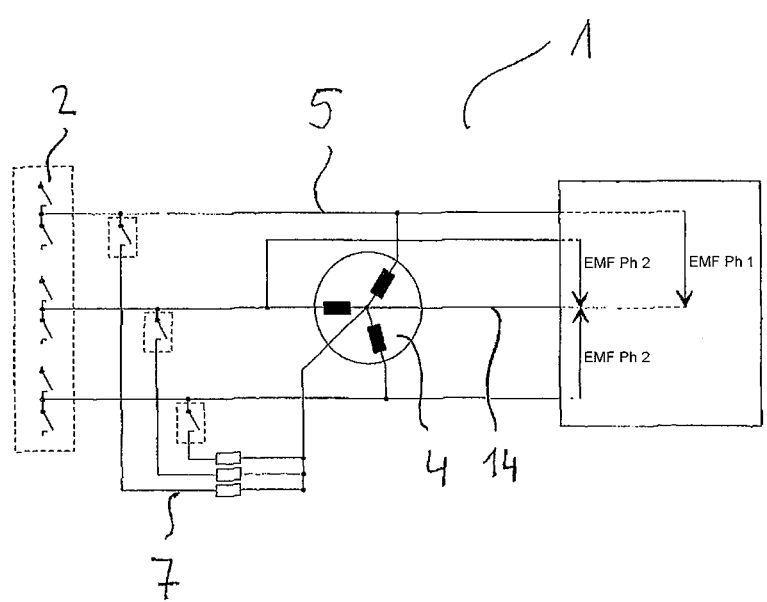
FIG. 3 shows another version of the control circuit.

As shown in FIG. 3, it is also possible to directly tap the EMF via an access 14 directly at the star point 3 and thereby omit the capacitor 10 and start unit 11.

REFERENCE NUMBERS

1 Synchronous machine
2 Power supply
3 Star point
4 Stator windings
5 Lead
6 Switch
7 Clamping circuit 8 Resistor
9 Switch
10 Capacitor
11 Start unit
12 Switch
13 High impedance resistor
14 Access to the star point
a Open switching state/no sampling
S Switching/sampling state
T1 Time interval
T2 Total period of time
T3 Time interval
z Closed switching state/sampling state

The invention claimed is:

1. A control circuit for a synchronous machine of a dental handpiece for controlling a rotary speed of the synchronous machine comprising a power supply having gate driver switches,
   wherein outputs from the gate driver switches are connected via leads to stator windings of a motor having a star point; a clamping circuit comprising clamping switches, resistors and a capacitor; wherein the capacitor is connected across the resistors and the clamp switches to the stator windings of the motor for a demagnetization of the synchronous machine after closing the clamping switches; and
   wherein the capacitor simulates a star point voltage.

2. The control circuit according to claim 1, wherein the clamping circuit is clamped to the capacitor of the control circuit.

3. The control circuit according to claim 1, wherein the control circuit has a preset voltage (11) which is connectable to the capacitor by a switch to pre-charge the capacitor to an expected voltage level of the star point.

4. A method for determining the angular position of a rotor of a synchronous machine for controlling a rotary speed of the synchronous machine, comprising:
   (a) providing a control circuit for the synchronous machine comprising a power supply having gate driver switches, wherein outputs from the gate driver switches are connected via leads to stator windings of a motor having a star point; a clamping circuit comprising clamping switches, resistors and a capacitor; wherein the capacitor is connected across the resistors and the clamp to the stator windings of the motor;
   (b) passively simulating a star point voltage by charging the capacitor to an expected value of the star point wherein the capacitor is connected to a preset voltage by a switch;
   (c) interrupting a power supply to the synchronous machine for a total period of time (T2) by opening gate driver switches;
   (d) closing the clamp switches for a total period of time (T1) while the synchronous machine is still rotating;
   (e) opening the clamp switches after the time interval (T1);
   (f) measuring an induced electromagnetic force (EMF) during a time interval (T3), and
   (g) determining the angular position of the rotor from the EMF.

5. The method according to claim 4, wherein the EMF is measured with high impedance.

6. The method according to claim 4, wherein the EMF is measured several times per rotation of the rotor.

* * * * *